United States Patent [19]

McKinney et al.

[11] 4,340,611

[45] Jul. 20, 1982

[54] PROCESS FOR REMOVING SOYBEAN HULLS

[75] Inventors: Howard F. McKinney, Edwardsville, Ill.; David R. Gardner; Frederick C. Wear, both of St. Louis, Mo.

[73] Assignee: McDonnell Douglas Corporation, St. Louis, Mo.

[21] Appl. No.: 170,096

[22] Filed: Jul. 18, 1980

[51] Int. Cl.[3] .............................................. A21D 6/00

[52] U.S. Cl. .................................... 426/241; 426/242; 426/482

[58] Field of Search ............... 426/241, 242, 237, 482; 34/4, 15; 219/10.55 M, 10.55 R

[56] References Cited

U.S. PATENT DOCUMENTS

| | | | |
|---|---|---|---|
| 2,601,421 | 6/1952 | Thaning | 426/241 |
| 3,141,777 | 7/1964 | Guidarelli et al. | 426/242 |
| 3,215,539 | 11/1965 | Landy | 426/241 |
| 3,558,327 | 1/1971 | Watkins | 426/237 |
| 4,015,341 | 4/1977 | McKinney et al. | 34/15 |

*Primary Examiner*—Raymond N. Jones
*Assistant Examiner*—George C. Yeung
*Attorney, Agent, or Firm*—Gravely, Lieder & Woodruff

[57] ABSTRACT

A process for removing hulls from soybeans comprises the steps of placing the soybeans in an atmosphere of reduced pressure, subjecting the beans to microwave energy while the beans are within the atmosphere of reduced pressure, removing a portion of the moisture from the beans until the moisture content of the soybeans is about 7.46 to about 10% on a wet basis, removing the soybeans from the atmosphere of reduced pressure, the temperature of the soybeans leaving the reduced pressure atmosphere being at least 110° F. and less than 160° F., immediately cracking the hulls of the hot soybeans without tempering, and removing the hulls from the hot soybeans.

4 Claims, No Drawings

PROCESS FOR REMOVING SOYBEAN HULLS

BACKGROUND OF THE INVENTION

In processing soybeans into high-protein soybean meal, the outer layer of the bean is removed before the oil is extracted from the beans. Removal of the outer layer of the soybean traditionally is done by passing the beans through cracking rolls to fracture the hulls and an aspirator is then used to separate the hulls from the cotyledons in the crushed soybeans.

Before crushing the soybeans, the beans are dried to remove about 1 to 3% of the moisture remaining in the beans and the dried beans are stored for about eight days to equalize the moisture content in the beans so that the hulls crack uniformly when passed through the cracking rolls.

The eight day hold is quite expensive because it adds to the overall processing time. It also requires extensive storage facilities which further adds to the expense of the present process.

The drying of the beans presently is done by any of several conventional drying processes, such as heated air passed over a moving conveyor containing the beans, etc. All of the known conventional drying processes require the eight day storage period.

In the present process, we have discovered a way to eliminate the resting period. In our process the dried beans can be cracked immediately after drying. We use microwave energy to dry the beans and this allows them to be cracked without holding, using conventional commercial cracking rolls.

An additional advantage of the microwave vacuum process is that the beans can be cracked while still hot from the dryer and still produce excellent dehulling. Soybeans are conventionally dehulled at ambient temperature and then heated for further processing. Cracking and dehulling at elevated temperature reduces process energy costs.

Watkins U.S. Pat. No. 3,558,327 shows the application of moisture and microwave energy to grain to assist in the milling of the grain. In the process of U.S. Pat. No. 3,558,327 the water level of the grain is raised, then the moistened grain is treated with microwave energy to reduce the moisture level to that which is desired for milling.

By comparison, the present process is used to remove hulls from soybeans and involves subjecting the soybeans to a vacuum and simultaneously treating with microwave energy to reduce the moisture without injuring the grain. The beans are then passed through cracking rolls to crack the outer seed hull. The hulls are separated from the meats by an aerodynamic separation. The present process not only improves product quality, but also it reduces the total energy required for the drying.

Accordingly, it is an object of this invention to provide a process for removing the hulls from soybeans without the necessity of holding the beans after drying. It is another object of the present invention to provide a process of drying soybeans using microwave energy wherein the beans are further processed immediately after drying, thus obviating a long time storage step and saving time and money.

These and other objects and advantages will become apparent hereinafter.

DETAILED DESCRIPTION

In preparing soybeans for processing into oil and high-protein soybean meal, the outer layer or hull of the bean must be removed before the bean can be separated into meal and oil. The beans in storage before treatment normally have a moisture content of about 12% (wet basis). To remove the hulls, the moisture content of the beans must be about 9–10% (wet basis). Thus, about 2–3% moisture must be removed before the outer layer can be removed from the beans.

In conventional drying, the dried beans are allowed to stand about eight days to temper the beans before the hulls are removed. Using microwave energy to dry, we have found we can eliminate this hold period. This reduces the inventory cost of the soybeans and improves the flexibility of process scheduling.

In the process, a microwave dryer of the type shown in McKinney, et al Patent No. 4,015,341, issued April 5, 1977, is used. In this apparatus, the frequency of the microwaves is between about $10^2$ $MH_z$ and $10^4$ $MH_z$. As a practical matter, frequencies of 915 $MH_z$ and 2450 $MH_z$ will be used as these are the only two frequencies which the Federal Communications Commission has allotted for commercial microwave heating applications.

The absolute pressure in the dryer is about 5 to about 250 Torr, and preferably is about 150 Torr.

The microwave power density in the soybeans is about 0.25 to about 10 watts/$in^3$ and preferably is about 1 watt/$in^3$. The measure reference is volume of product or volume of the soybeans being dried.

The outlet temperature of the beans is about 110° to about 160° F. and preferably is about 150° F.

The final moisture content of the soybeans is about 9 to about 12% (wet basis).

SPECIFIC EXAMPLE

Using an apparatus as described in U.S. Pat. No. 4,015,341 with a 4" drying chute, 1.82 bushels/hour of soybeans having an initial moisture content of 11.29% (wet basis) was fed into the apparatus. A power density of 1.66 watts/$in^3$ of beans was applied to the soybeans for a period of 22 minutes. The inlet temperature of the grain was 79° F. and the outlet temperature was 160° F. The pressure in the cavity varied between 28 and 43 mm Hg with an average of 38.7 mm Hg. The final moisture content was about 7.46% (wet basis). This is less water than is usual in the final product, but the initial moisture was lower than normal also. About 3.72% moisture was removed which is somewhat more than normal, but is not an abnormal amount. The soybeans dried in this example were rolled between two hard surfaces. The skins or hulls split very easily and were easily removed and separated from the seed.

What is claimed:

1. A process for removing hulls from soybeans without damaging the grain comprising the steps of placing the soybeans in an atmosphere of reduced pressure, subjecting the beans to microwave energy while the beans are within the atmosphere of reduced pressure, removing a portion of the moisture from the beans until the moisture content of the soybeans is about 7.46 to about 10% on a wet basis, removing the soybeans from the atmosphere of reduced pressure, the temperature of the soybeans leaving the reduced pressure atmosphere being at least 110° F. and less than 160° F., immediately cracking the hulls of the hot soybeans without tempering, and removing the hulls from the hot beans.

2. The process of claim 1 wherein the microwave power density is about 0.25 to about 10 watts/$in^3$ of soybeans.

3. The process of claim 1 wherein about 0.5 to about 3% moisture is removed from the soybeans.

4. The process of claim 1 wherein the pressure in the reduced pressure atmosphere is about 5 to about 250 Torr.

* * * * *